Patented Aug. 21, 1928.

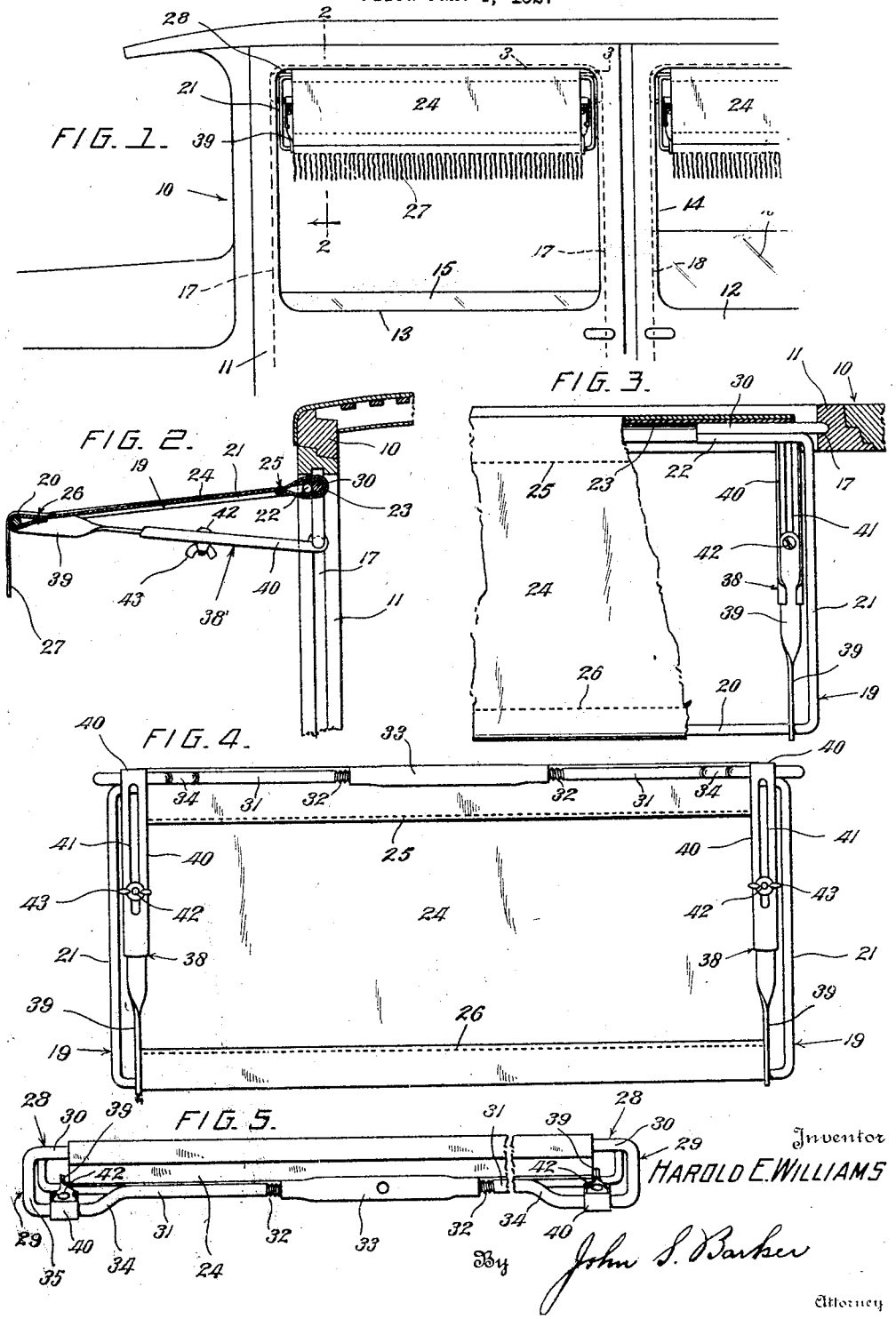

1,681,831

UNITED STATES PATENT OFFICE.

HAROLD E. WILLIAMS, OF CARTHAGE, MISSOURI.

AWNING FOR VEHICLES.

Application filed January 4, 1927. Serial No. 158,904.

This invention relates to awnings for vehicles and has for one of its objects to provide a device of this character which will be simple in construction, comparatively inexpensive to manufacture and more efficient in use than those which have been heretofore proposed.

In my co-pending applications, Ser. No. 131,081, filed August 23, 1926, entitled "Awnings", and Ser. No. 146,994, filed November 8, 1926, entitled "Sun and rain shields for vehicles", I have shown and described devices of the same general character which are adapted to be mounted in the window opening or glass run of a vehicle door and which are maintained therein through the resiliency of the awning frame. Likewise, in the last mentioned prior application I have disclosed an awning which is not only slidably adjustable in the glass run but which is also angularly adjustable and it is to this last mentioned type to which the present invention more particularly relates.

The present invention is distinguished, however, from that disclosed in my said application #146,994 in that, instead of the frame being maintained in position through its own resilience, provision is made whereby the said frame may be positively forced into engagement with the walls of the window opening or glass run; and furthermore, a different means is provided for controlling the angular adjustment of the awning relative to the door.

With the above and other objects in view which will appear as the description proceeds, the invention consists in the novel details of construction and combinations of parts more fully hereinafter described and particularly pointed out in the appended claims.

Referring to the accompanying drawings forming a part of this specification in which like reference characters designate like parts in all the views:

Fig. 1 is a side elevational view of a portion of a vehicle body of the well known closed type with the present invention applied thereto;

Fig. 2 is an enlarged vertical sectional view taken approximately on the plane indicated by the line 2—2 of Fig. 1;

Fig. 3 is a fragmentary plan view partially broken away and in section taken approximately on the plane indicated by the line 3—3 of Fig. 1;

Fig. 4 is an inverted plan view of the awning or shade detached from the vehicle; and, Fig. 5 is a rear elevational view of the said awning or shade.

Referring more particularly to the said drawings the numeral 10 indicates generally a vehicle body of the closed type which is provided with the usual doors 11 and 12 having the window openings 13 and 14 respectively which may be closed by the panes of glass 15 and 16 sliding in the usual grooves or glass runs 17 and 18.

As in the preceding applications above mentioned, the awning or shield proper comprises a frame 19 formed of a rod or tube bent to substantially U-shape when viewed in plan to provide a front bar 20 and spaced side arms 21 as will be clear from the drawings. The extreme ends of the said side arms 21 are turned inwardly as at 22 in substantially the same horizontal plane as the front bar 20. The said inturned ends 22 are slidably received within a hollow member 23 which extends parallel to the front bar 20 of the frame and constitutes the fourth side of a hollow rectangle. A shade member 24 of canvas or other suitable material has one edge looped around the member 23 and secured by stitching 25 while its opposite edge is looped around the bar 20 and secured by stitching 26. The last mentioned edge may be provided with suitable fringe or other ornamental material 27 as will be clear from the drawings.

The awning frame just described operates to hold the canvas or other covering 24 permanently distended and in a desirably taut condition.

In order to mount the awning in the window opening or glass run in accordance with the present invention, a separate supporting frame 28 is provided, comprising a pair of substantially U-shaped members 29 having short legs 30 which extend into the member 23 and lie adjacent to the inturned ends 22 of the frame member 19. The said members 29 are provided with longer legs 31 which are axially aligned as will be clear from Figs. 4 and 5 and have their extreme ends oppositely threaded as at 32 to receive a sleeve member 33 which serves as an adjusting means whereby the said members 29 may be transversely adjusted as will appear more fully below. The said longer legs 31 are preferably offset as at 34 and the connecting bars 35 of the U-shaped members 29 in the normal position of the parts, occupy substantially vertical planes and are adapted to enter the glass run such as 17 of the vehicle door as will be readily understood from the drawings.

The parts thus far described provide an awning or shade which may be readily mounted in the glass run of a vehicle door and which is not only vertically slidably adjustable therein but which is also angularly adjustable inasmuch as the frame 19 and canvas covering 24 together with the member 23 may pivot about the short legs 30 of the supporting members 29. In order to maintain the parts in any desired angular positions, brace members 38 are provided extending from the longer legs 31 of the supporting member to the front bar 20 of the frame 19. These brace members are adjustable and preferably comprise two slidably connected members 39 and 40, the former of which is pivotally mounted upon the front bar 20 while the latter is pivotally mounted upon the longer legs 31 of the U-shaped members 29. One of the members such for example as the member 40 may be provided with a slot 41 while the other member such as 39 carries a screw or bolt 42 which extends through the said slot and carries a suitable clamping nut 43 whereby the said members 39 and 40 may be rigidly connected after having been adjusted longitudinally to the proper length.

It will be readily apparent from the foregoing description taken in connection with the drawings, that with the parts positioned in the glass run in a vehicle as shown the angular position of the shade or awning may be readily varied to suit different conditions by loosening the clamping nuts 43 and then manually swinging the shade 24 and its frame 19 upwardly or downwardly about the shorter legs 30 of the supporting frame 28, as a pivot, during which operation the brace members 39 and 40 will slide relative to one another to accommodate their combined length to the particular position of the shade, whereupon by again tightening the clamp nuts 43 the parts may be rigidly held in any desired position.

The adjustability of the supporting frame 28 provided through the threaded sleeve connection 33 not only permits of the shade supporting frame 28 being positively forced into the glass run to hold the device in position but also permits within certain limits of the awning being employed with doors having window openings of various widths. During the transverse adjustment of the parts of the supporting frame 28 the brace members 40 will slide thereon so as to maintain the substantially parallel and prevent binding of the parts.

It will be noted from Figs. 2 and 5 of the drawings that the connecting bars 35 of the U-shaped members 29 are relatively short, whereby they occupy a comparatively small amount of space in the glass runs 17. It therefore results that the panes of glass may be raised almost to the top of the said runs whereby it is possible to substantially completely close the window opening without removing the awning from place. It also results from this feature, that, while the pivotal connections, between the brace members 40 and the longer legs 31 of the U-shaped members 29, are in relatively close proximity to the pivotal connections between the cover member 24 and the shorter legs 30 of the said members 28, there is sufficient displacement between these pivotal connections to provide a substantially triangular structure, as seen in Fig. 2, wherein the brace members may effectively perform their functions.

While one form of the invention has been thus illustrated and described, it is obvious that those skilled in the art may vary the details of construction as well as the precise arrangements of parts without departing from the spirit of the invention and therefore, it is not wished to be limited to the above disclosure except as may be required by the claims.

What is claimed is:

1. In a vehicle awning of the class described, a pair of aligned substantially U-shaped supporting members, each having a portion adapted to enter the glass run of a vehicle door; means connecting said members for adjusting them toward and from one another; a frame and a cover therefor, slidably and pivotally connected to one pair of legs of said members; and longitudinally extensible braces pivotally connected to said frame, and slidably and pivotally connected to the other legs of said members.

2. A permanently distended, non-collapsible awning comprising a cover frame having outer and inner cross members; a supporting frame having side parts for engaging with the glass runs of a window opening, and upper and lower cross parts; means for forcing the side parts of the supporting frame apart to engage with the glass runs; a sleeve encircling portions of the cover frame and also portions of the supporting frame, whereby these are pivotally united, and extensible members interposed between the lower cross part of the supporting frame and the outer cross member of the cover frame.

3. In a vehicle awning of the class described, a supporting frame comprising a pair of members having complementary upper and lower horizontal legs connected by vertical portions adapted to engage in the glass run of a vehicle door; means connecting said lower legs, adapted to positively adjust them toward and from one another; a permanently distended, noncollapsible awning, comprising a substantially U-shaped frame and a cover therefor, the free ends of the legs of said frame being turned inwardly toward one another and positioned adjacent the upper legs of said supporting frame; a transverse sleeve encircling said adjacent leg portions, pivotally connecting them together, said supporting frame legs being axially slidable therein; and longitudinally extensible brace members pivotally connected to the front bar of said cover frame and the lower legs of said supporting frame.

HAROLD E. WILLIAMS.